US010263782B2

United States Patent
Billings et al.

(10) Patent No.: US 10,263,782 B2
(45) Date of Patent: Apr. 16, 2019

(54) SOFT-TOKEN AUTHENTICATION SYSTEM

(75) Inventors: Roger E Billings, Independence, MO (US); John A Billings, Gallatin, MO (US)

(73) Assignee: GOLDKEY CORPORATION, Kansas City, MO (US)

( * ) Notice: Subject to any disclaimer, the term of this patent is extended or adjusted under 35 U.S.C. 154(b) by 482 days.

(21) Appl. No.: 13/272,033

(22) Filed: Oct. 12, 2011

(65) Prior Publication Data

US 2013/0097427 A1 Apr. 18, 2013

(51) Int. Cl.
*H04L 9/32* (2006.01)

(52) U.S. Cl.
CPC .......... *H04L 9/3228* (2013.01); *H04L 9/3234* (2013.01); *H04L 9/3273* (2013.01)

(58) Field of Classification Search
CPC . H04L 9/00; H04L 9/08; H04L 9/0816; H04L 9/0838–9/0841; H04L 9/0861–9/0863; H04L 9/0869; H04L 9/0891; H04L 9/32; H04L 9/3226; H04L 9/3228; H04L 9/3234; H04L 9/3236; H04L 9/3271; H04L 9/3273; H04L 63/04; H04L 63/0428; H04L 63/0435; H04L 63/06; H04L 63/061; H04L 63/067; H04L 63/08; H04L 63/083; H04L 63/0869; G06F 21/44; G06F 21/445
USPC ............... 713/168–169, 171, 182, 189, 193; 705/64, 71–72; 726/2–3, 5, 7, 10, 16–17, 726/19–20, 26–28; 380/255, 259, 262, 380/263, 273, 277, 283, 44; 709/203, 709/227–228, 237
See application file for complete search history.

(56) References Cited

U.S. PATENT DOCUMENTS

| 5,491,752 | A  | * | 2/1996  | Kaufman et al. ............... 380/30 |
| 7,373,515 | B2 | * | 5/2008  | Owen et al. .................... 713/182 |
| 7,409,552 | B2 | * | 8/2008  | Buttyan et al. ................. 713/172 |
| 8,572,387 | B2 | * | 10/2013 | Narayanan et al. .......... 713/176 |
| 8,793,779 | B2 | * | 7/2014  | Ferchichi ............... H04L 63/062 726/19 |
| 2001/0034837 | A1 | * | 10/2001 | Kausik et al. ................. 713/185 |
| 2002/0152377 | A1 | * | 10/2002 | Bauman et al. ............... 713/168 |

(Continued)

OTHER PUBLICATIONS

Ben-Asher et al.,"On the need for different security methods on mobile phones" [Online], 2011 [Retrieved on May 4, 2014], Proc. of the 13th Int. Conf. on Human Computer Interaction with Mobile Devices and Services (MobileHCI '11), ACM [www.acm.org], pp. 465-473 Retrieved from: <http://dl.acm.org/ft_gateway.cfm?id=2037442&ftid=1035670&dwn=1&CFID=332718188&CFTOKEN=53258665>.*

*Primary Examiner* — Eric W Shepperd
(74) *Attorney, Agent, or Firm* — Fox Rothschild LLP

(57) ABSTRACT

A system for authenticating a user and his local device to a secured remote service with symmetrical keys, which utilizes a PIN from the user and a unique random value from the local device in such a way that prevents the remote service from ever learning the user's PIN, or a hash of that PIN. The system also provides mutual authentication, verifying to the user and local device that the correct remote service is being used. At the same time, the system protects against PIN guessing attacks by requiring communication with the said remote service in order to verify if the correct PIN is known. Also, the system works in such a way as to change the random value stored on the user's local device after each authentication session.

19 Claims, 4 Drawing Sheets

(56) References Cited

U.S. PATENT DOCUMENTS

| | | | |
|---|---|---|---|
| 2004/0002923 A1* | 1/2004 | Ramaswamy et al. | 705/72 |
| 2004/0103325 A1* | 5/2004 | Priebatsch | 713/202 |
| 2005/0010680 A1* | 1/2005 | Zick et al. | 709/237 |
| 2005/0094805 A1* | 5/2005 | Kitani | H04L 9/0662 380/28 |
| 2007/0076889 A1* | 4/2007 | DeRobertis et al. | 380/279 |
| 2007/0157027 A1* | 7/2007 | Palekar et al. | 713/171 |
| 2007/0180234 A1* | 8/2007 | Labaton | 713/159 |
| 2007/0198836 A1* | 8/2007 | Fedyk | H04L 9/0833 713/171 |
| 2008/0046740 A1* | 2/2008 | Narayanan | H04L 63/083 713/176 |
| 2008/0072061 A1* | 3/2008 | Cannon | G06F 21/34 713/185 |
| 2010/0262830 A1* | 10/2010 | Kusakawa | G06F 21/77 713/172 |
| 2011/0016320 A1* | 1/2011 | Bergsten et al. | 713/170 |
| 2011/0108623 A1* | 5/2011 | Hammad | 235/382 |
| 2011/0191842 A1* | 8/2011 | Lindholm et al. | 726/9 |
| 2011/0197266 A1* | 8/2011 | Chu et al. | 726/5 |
| 2012/0023559 A1* | 1/2012 | Dietrich et al. | 726/6 |
| 2012/0089519 A1* | 4/2012 | Peddada | 705/71 |
| 2012/0159146 A1* | 6/2012 | Kamieniecki | G06F 21/10 713/150 |
| 2012/0300930 A1* | 11/2012 | Jutla et al. | 380/262 |
| 2013/0024923 A1* | 1/2013 | Wallaja | G06Q 20/00 726/6 |
| 2013/0024947 A1* | 1/2013 | Holland et al. | 726/28 |
| 2014/0019364 A1* | 1/2014 | Hurry et al. | 705/67 |

\* cited by examiner

SOFT-TOKEN AUTHENTICATION SYSTEM

BACKGROUND OF THE INVENTION

This invention relates to the use of software tokens (also known as soft-tokens) to securely sign in to remote services. As the name implies, soft-tokens are software-only alternatives to hardware based tokens and smart cards. As such, soft-tokens are meant to fill the gap where hardware tokens are impractical or inconvenient and password-only verification is not a high enough level of security.

Traditionally, access to remote services was protected almost solely by user names and passwords. As the weaknesses in a password-only system were realized by the industry, hardware based authentication devices were developed to provide an additional factor of authentication. This required users to have a physical device and know the associated PIN (Personal Identification Number) for that device. However, there was still a need for stronger authentication without adding an additional hardware device for every user, and so soft-tokens were conceived.

In the scope of this invention, a soft-token is a logical grouping of data used to verify the local user device being used by a user in addition to the user PIN which is something the user knows himself. This is considered an improvement in security over password-only systems since an attacker would need to compromise the user device in addition to knowing the user's PIN. For the scope of this invention, the use of PIN is considered to be synonymous with password.

State-of-the-art products thus providing soft-token authentication suffer, from one or more of the following deficiencies and limitations that limit the realization of their full potential and effectiveness:

First, systems that store soft-token credentials in a certificate store or key chain that is available to other applications on the device are vulnerable to having the soft-tokens stolen or misused by malware and malicious users.

Second, systems that protect against the above stated vulnerability commonly encrypt the credential data with a PIN. However, this makes the encrypted data vulnerable to brute-force-attacks on the user's PIN since the PIN can be guessed and verified without any additional information.

Third, soft-tokens that use a stored credential that changes infrequently cannot prevent that credential from being copied and used on other devices, which is in contradiction to the benefits and reason for having a soft-token in the first place.

Fourth, soft-token systems that rely on a stored private key require that the device using the soft-token perform an asymmetric operation each time the token is used. As soft-tokens could be used on a variety of small mobile devices such as smart phones and tablets, this additional computational requirement may degrade the user experience.

BRIEF SUMMARY OF THE INVENTION

In view of the above described state of the art, the present invention seeks to realize the following objects and advantages:

It is an object of the present invention to provide a soft-token system that uses a shared secret for mutual authentication between a user device and a remote service. The shared secret being stored on the user device is encrypted by a cryptographic hash of the user's PIN in such a way that decryption with any PIN hash will produce a plausible secret value. Thus the PIN cannot be guessed without attempting to authenticate with the remote service, using the produced secret value.

It is another object of the present invention to provide a system whereby the shared secret described above is changed to a new, completely random value as part of the soft-token mutual authentication. Doing so will cause any duplicate copies of the soft-token credential to become invalid and useless with each use.

It is a further object of the present invention to provide a system whereby the user's soft-token PIN, or a hash thereof, never exists on a remote server. In the unlikely event that the remote server is compromised, no user PINs will be exposed.

These and other objects and advantages of the invention will become more fully apparent from the description and claims which follow, or may be learned from the following discussion of the practice of the invention.

The present invention provides a system for authenticating a user and his local device to a secured remote service with symmetrical keys, which utilizes a PIN from the user and a unique random value from the local device in such a way that prevents the remote service from ever learning the user's PIN, or a hash of that PIN. The system also provides mutual authentication, verifying to the user and the local device that the correct remote service is being used. At the same time, the system protects against PIN guessing attacks by requiring communication with the said remote service in order to verify if the correct PIN is known. Also, the system works in such a way as to change the random value stored on the user's local device after each authentication session.

The system uses a soft-token created and saved during installation on a user device, which could be a personal computer, a desktop computer, a cell phone, a pad computer, or any other networked device, to authenticate with a remote service. A remote service could consist of one or more sewers connected to a network, such as the Internet. As part of the soft-token creation, a shared secret is generated. A shared secret is a random number that is known by both the user device and the remote service, but is only stored on the user device after being encrypted using a derivative of the user's PIN. When the user attempts to sign in to a remote service for which a soft-token has been previously installed on his user device, the user will be prompted to enter his PIN. A derivative of the user's PIN such as a cryptographic hash of the user's PIN will be used to decrypt the previously stored shared secret on the user device. However, the user device will not yet know if the decrypted value is the correct shared secret. To verify the shared secret, a challenge and response sequence will take place with the remote service. If the remote service knows the same secret that was decrypted with the user's PIN, then this mutual authentication will succeed. If the wrong PIN was used, authentication will fail and the remote service will be able to block the soft-token after too many failed attempts.

BRIEF DESCRIPTION OF THE DRAWINGS

In order to better appreciate how the above recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS OF THE INVENTION

Figure 1:
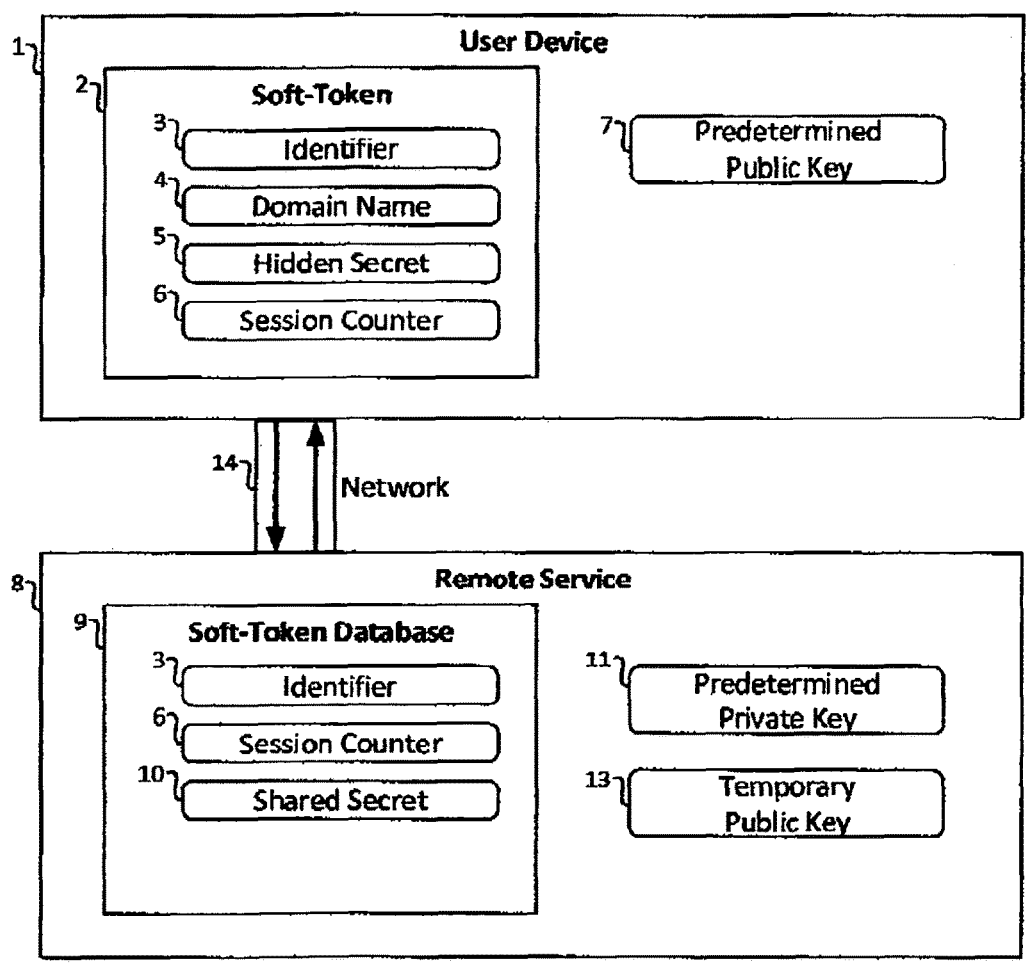
FIG. 1 is a block diagram showing soft-token data stored on a user device and the relationship of the soft-token to a remote service during the creation of a soft-token.

In one example of the preferred embodiment of the invention, a secure means of sign in is provided for a user accessing a remote service over a network. Referring to FIG. 1, a user device 1 is connected to a remote service 8 over a network. The user device 1 could be any networked device such as a smart phone, pad computer, desktop computer, or laptop computer. The remote service 8 could be a server. Before a secure sign in can take place, a soft-token 2 must first be created on the user device 1 by saving soft-token data to the user device storage media.

Components of Soft-Token Data

The soft-token data stored on the user device 1 consists of several different components. The identifier 3 is the soft-token ID which is used to uniquely identify the soft-token to the remote service 8. The identifier 3 helps the remote service 8 look up the correct shared secret 10 and session counter 6 from the soft-token database 9. The domain name 4 defines what remote service the soft-token 2 can be used with. The bidden secret 5 is the shared secret 10 known by the remote service 8 but which has been encrypted with a cryptographic hash of the user's PIN. The shared secret 10 changes every time the soft-token 2 is used for authentication. The session counter 6 starts out with a random value and is incremented each time the shared secret 10 is changed.

Creation of a Soft-Token

Figure 3:
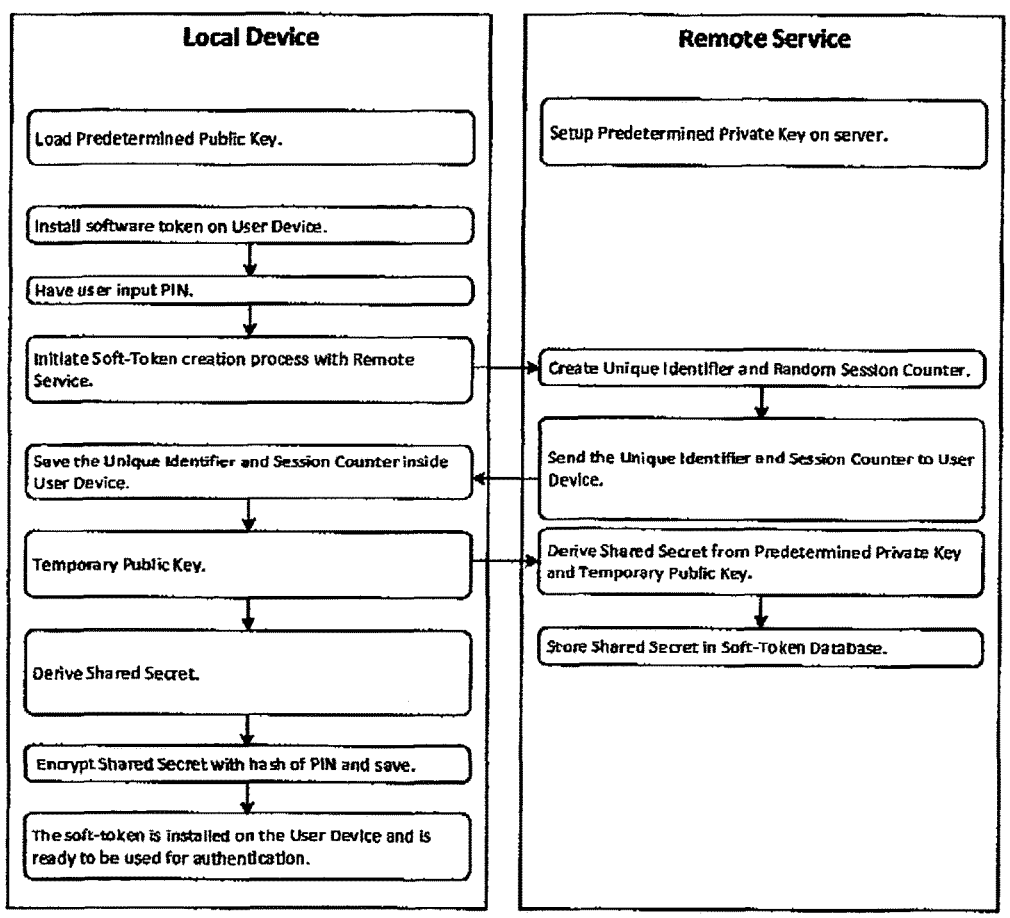
FIG. 3 illustrates a method of creating or installing a soft-token on a local device in association with a remote service over a network in accordance with an embodiment of the present invention.

The creation of a soft-token 2 consists of a simple negotiation between the user device 1 and the remote service 8 to determine the initial soft-token 2 data. In one example of the preferred embodiments, the remote service 8 chooses a new unique identifier 3 and a random session counter 6. These two values are sent by some secure out of band method, such as a URL protocol handler or browser add-on, to the user device 1. The user local device 1 saves the identifier 3 and session counter 6 from the remote service 8 plus the domain name 4 that points to the service 8. Next, the user device 1 uses a predetermined public key 7, whose predetermined private key 11 is known by the remote service 8, to derive a shared secret 10 which is encrypted with a bash of the PIN from the user before being saved on the user device 1 as the hidden secret 5. Likewise, the remote service 8 uses its predetermined private key 11 and a temporary public key 13 from the user device to generate the same shared secret 10 to be saved in the soft-token database 9. The soft-token 2 is now created and ready for normal use. A preferred process flow for creating a soft-token on a user device is illustrated in FIG. 3.

Soft-Token Usage Example

Figure 2:
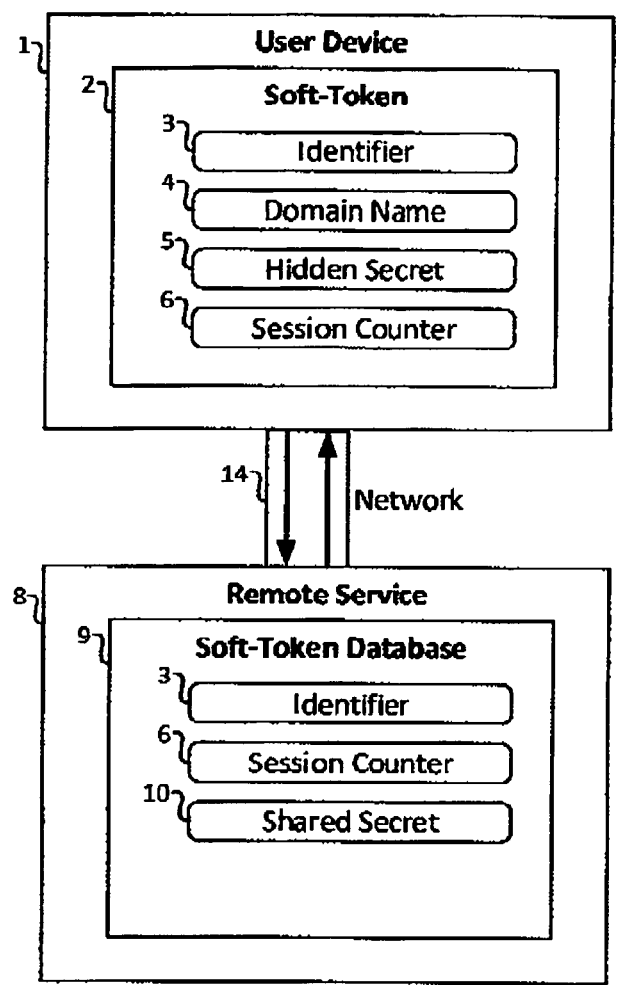
FIG. 2 is a block diagram depicting the relationship of the soft-token on a user device to a remote service during authentication over a network.

In one example of the preferred embodiment (see FIG. 2), an existing soft-token is used to sign in a user with a user device 1 to a remote service 8 over the network 14. First, the local device 1 verifies that it has a soft-token 2 with a domain name 4 that matches the one being used by the remote service 8. Then the user is required to enter a PIN for the soft-token 2. A cryptographic hash of the PIN is, used to decrypt the hidden secret 5 stored on the user device 1. The correct shared secret 10 is only produced if the right PIN is provided by the user.

Figure 4:
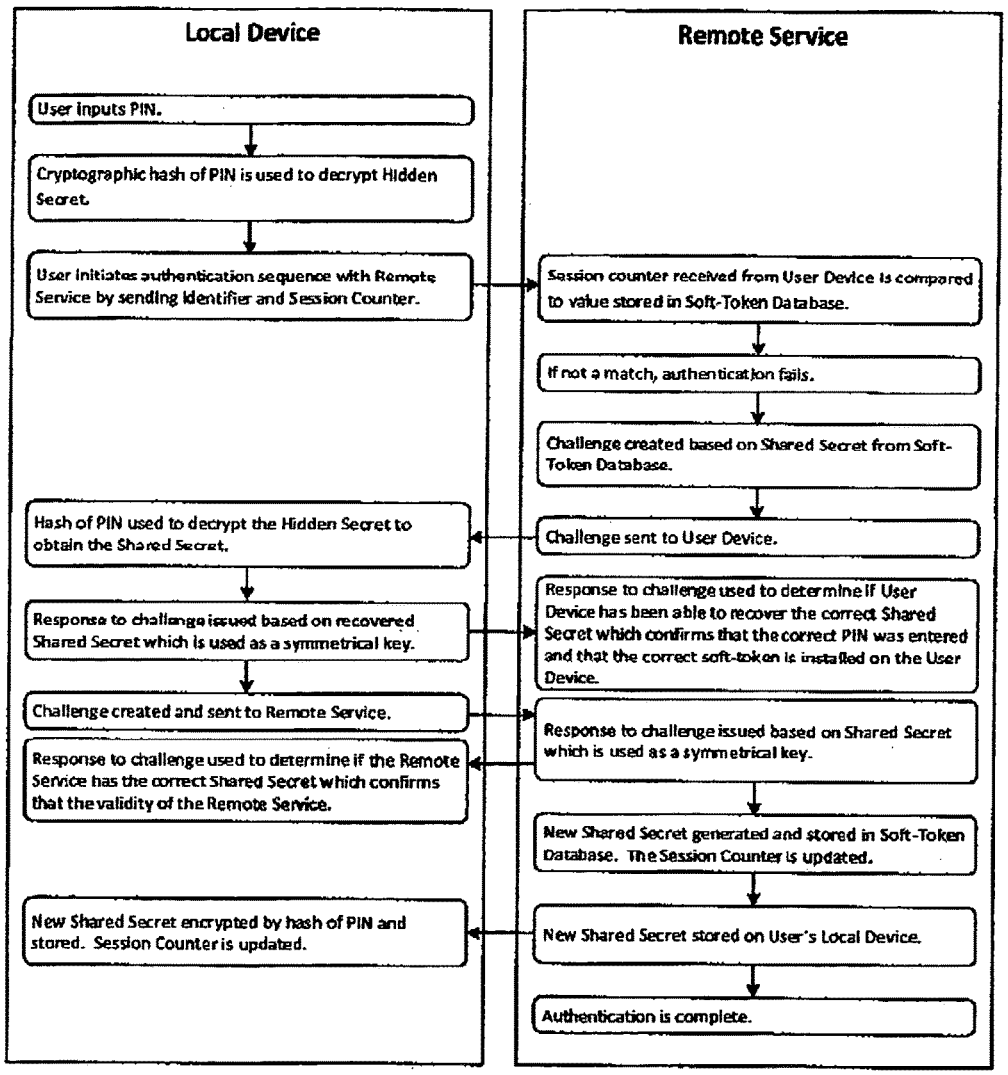
FIG. 4 illustrates a method of using a soft-token on a local device to authenticate or sign in to a remote service over a network in accordance with an embodiment of the present invention.

Next, the user device 1 starts an authentication sequence with the remote service 8 by providing its soft-token identifier 3 and session counter 6 values to the remote service 8. The remote service 8 looks up the identifier 3 and the session counter in the soft-token database 9. If the session counter 6 from the user device 1 does not match the expected value from the database 9, the remote service 8 rejects the soft-token 2 and authentication fails. Otherwise, the remote service 8 continues by creating an authentication challenge based on the appropriate shared secret 10 from the soft-token database 9 and sending it to the user device 1. The user device 1 uses what it believes to be the correct shared secret 10 as a symmetrical key to generate a response to the remote service's challenge. This response is sent to the remote service 8 along with another challenge created by the local device 1. The remote service 8 is now able to determine if the user device 1 has the correct shared secret 10 and thereby if the user entered the correct PIN. The remote service 8 finishes the authentication sequence by generating a similar response to the challenge from the user device 1 and sending it back to the user device 1. By verifying the remote service's response, the user device 1 can determine if the remote service 8 also knows the same shared secret 10 and is therefore the correct remote service. As part of the challenge and response process described above, a new shared secret 10 is also negotiated. As a side effect of this process, the remote service 8 is able to verify that the user device 1 received and knows the same new shared secret 10. At the completion of the authentication sequence, both the user device 1 and remote service 8 update the shared secret 10 they have stored for the soft-token 2. On the user device 1, this involves encrypting the new shared secret 10 with a cryptographic hash of the user's PIN and saving a new hidden secret 5. A preferred process flow for a soft-token authentication is illustrated in FIG. 4.

In view of the foregoing, it will be appreciated that the present invention provides the feature of protecting the user's PIN from being verified except during a challenge and response process that involves both a remote service and the user device. Furthermore, the remote service has the ability of counting wrong PIN attempts and blocking a soft-token when too many failed attempts have been made, while still having no knowledge of the user's actual PIN. The present invention also allows a new shared secret to be negotiated and verified as part of each authentication, and thus reduces the risk of unauthorized duplication and use of soft-token data.

What we claim is:

1. A system establishing credentials for a mutual authentication between a user device and a remote service, the system comprising:

a user device that is configured to communicate with a remote service via a communication link between the user device and the remote service, the user device comprising:
- a memory that stores:
  - a shared secret which is a random number that is known by both the user device and the remote service, wherein the shared secret is stored on a soft-token as a hidden secret such that the shared secret is encrypted by a cryptographic hash of a Personal Identification Number ("PIN") of the user such that decryption with any PIN hash will produce a plausible secret value; and
  - instructions for a challenge response sequence between the user device and the remote service to verify the shared secret,
- wherein, as part of the challenge response sequence between the user device and the remote service to verify the shared secret, the user device and the remote service negotiate a new value for the shared secret.

2. The system of claim 1, wherein the new value for the shared secret is a random value each time that the soft-token is used for authentication.

3. The system of claim 1, further comprising:
the remote service, wherein the remote service comprises a memory that also stores instructions for the challenge response sequence; and
wherein the user's PIN or a hash thereof, never exists on the remote service.

4. The system of claim 1, wherein the instructions for the challenge and response sequence comprise instructions to verify to the user device that the user device is connected to a correct remote service.

5. The system of claim 1, wherein the instructions for the challenge and response sequence comprise instructions to authenticate the user device to the remote service and also verify to the remote service that a correct PIN has been entered by a user.

6. The system of claim 1, wherein the instructions for the challenge and response sequence comprise instructions to ensure that the user's PIN, or any hash value derived therefrom, is never communicated to the remote service.

7. The system of claim 1, wherein the instructions for the challenge response sequence comprise instructions to, by the user device:
receive, from the remote service, an authentication challenge based on the shared secret;
in response to receiving the authentication challenge, generate a response using the shared secret as a symmetrical key, create an other authentication challenge, and send the response and the other authentication challenge to the remote service;
receive, from the remote service, a response to the other authentication challenge; and
in response to receiving the response to the other authentication challenge, determine if the remote service has the shared secret by verifying the response to the other authentication challenge.

8. The system of claim 7, wherein the remote service comprises a memory that stores instructions for the challenge response sequence, and
wherein the instructions of the remote service for the challenge response sequence further comprise instructions to, by the remote service:
determine if the user device has the shared secret by verifying the response generated by the user device;
generate the response to the other authentication challenge; and
transmit the response to the other authentication challenge to the user device.

9. A method for authenticating a user device to a remote service, the method comprising:
by the user device:
generating a random number to be used as a shared secret by a user of the user device and the remote service;
securely communicating the shared secret to the remote service to store the shared secret on the remote service such that the shared secret can be identified as associated with the user device;
encrypting the shared secret on the user device using a cryptographic hash of a Personal Identification Number ("PIN") of the user;
storing the encrypted shared secret into memory in the user device; and
performing an authentication process comprising receiving a PIN entered by the user and using the entered PIN to produce a plausible secret value which cannot be verified without attempting to authenticate with the remote service,
wherein, the authentication process verifies the shared secret, and as part of the authentication process between the user device and the remote service to verify the shared secret, the user device and the remote service negotiate a new value for the shared secret.

10. The method of claim 9, wherein the PIN of the user or a hash of the PIN of the user never exists on the remote service.

11. The method of claim 9, wherein the authentication process verifies the user device to the remote service and verifies the remote service to the user device.

12. The method of claim 9, wherein performing the authentication process further comprises, by the user device:
receiving, from the remote service, an authentication challenge based on the shared secret;
in response to receiving the authentication challenge, generating a response using the shared secret as a symmetrical key, creating an other authentication challenge, and sending the response and the other authentication challenge to the remote service;
receiving, from the remote service, a response to the other authentication challenge; and
in response to receiving the response to the other authentication challenge, determining if the remote service has the shared secret by verifying the response to the other authentication challenge.

13. The method of claim 12, wherein performing the authentication process further comprises, by the remote service:
determining if the user device has the shared secret by verifying the response generated by the user device;
generating the response to the other authentication challenge; and
transmitting the response to the other authentication challenge to the user device.

14. A system establishing credentials for a mutual authentication between a user device and a remote service, the system comprising:
the remote service;
the user device including a memory and at least one processor, wherein the user device is configured to communicate with the remote service via a communication link between the user device and the remote service;

a shared secret which is a random number that is known by both the user device and the remote service, the value of the shared secret changes after each authentication session, wherein the shared secret is encrypted by a cryptographic hash of a Personal Identification Number ("PIN") of a user such that decryption with any PIN hash will produce a plausible secret value; and memory containing instructions for a mutual authentication sequence between the user device and the remote service to provide mutual authentication.

15. The system of claim 14, further comprising instructions for transmitting secure data via the communication link secured by encrypting the data with the shared secret.

16. The system of claim 14, wherein the PIN of the user or a hash thereof never exists on the remote service.

17. The system of claim 14, wherein the instructions for the mutual authentication sequence comprise instructions to verify to the user device that the user device is connected to a correct remote service.

18. The system of claim 14, wherein the instructions for the mutual authentication sequence comprise instructions to authenticate the user device to the remote service and also verify to the remote service that a correct PIN has been entered by the user.

19. The system of claim 14, wherein the PIN of the user, or any hash value derived therefrom, is never communicated to the remote service.

* * * * *